(12) United States Patent
Sebö

(10) Patent No.: US 10,806,128 B2
(45) Date of Patent: Oct. 20, 2020

(54) DOG HARNESS WITH A LEASH-HOLDING ELEMENT WITH CONTROLLED DISPLACEMENT

(71) Applicants: JULIUS-K9 LLC, Tampa, FL (US); JULIUS-K9 Zrt., Szigetszentmiklós (HU)

(72) Inventor: Gyula Sebö, Szigetszentmiklós (HU)

(73) Assignees: JULIUS-K9 LLC, Tampa, FL (US); JULIUS-K9 ZRT., Szigetszentmiklós (HU)

( * ) Notice: Subject to any disclaimer, the term of this patent is extended or adjusted under 35 U.S.C. 154(b) by 182 days.

(21) Appl. No.: 15/919,162

(22) Filed: Mar. 12, 2018

(65) Prior Publication Data

US 2018/0263219 A1 Sep. 20, 2018

(30) Foreign Application Priority Data

Mar. 14, 2017 (HU) ..................................... 1700113

(51) Int. Cl.
*A01K 27/00* (2006.01)

(52) U.S. Cl.
CPC .......... *A01K 27/002* (2013.01); *A01K 27/005* (2013.01); *A01K 27/003* (2013.01)

(58) Field of Classification Search
CPC .. A01K 27/002; A01K 27/003; A01K 27/005; A47D 13/086; A47D 13/046
See application file for complete search history.

(56) References Cited

U.S. PATENT DOCUMENTS

| | | | | |
|---|---|---|---|---|
| 5,873,328 A | * | 2/1999 | Campbell | A01K 27/005 119/795 |
| D453,594 S | * | 2/2002 | Ishihara | D30/152 |
| 8,015,947 B2 | * | 9/2011 | Arreola | A01K 27/002 119/792 |
| 2002/0005175 A1 | * | 1/2002 | Donovan | A01K 27/005 119/798 |
| 2004/0192517 A1 | * | 9/2004 | Shiu | A47D 13/046 482/69 |

(Continued)

FOREIGN PATENT DOCUMENTS

HU P1400100 8/2015

*Primary Examiner* — Magdalena Topolski
*Assistant Examiner* — Katelyn T Truong
(74) *Attorney, Agent, or Firm* — Hershkovitz & Associates, PLLC; Abe Hershkovitz

(57) ABSTRACT

A dog harness is provided with a leash-holding element with controlled displacement for search dogs performing special work, comprising a back strap, a belly strap with a quick release buckle, and a chest strap running between the chest bone and the throat area. The leash-holding element with controlled displacement has an elastic design, stretching along the axis line, in line with the spine of the dog to a given extent, reducing the load on the dog when led on a leash, primarily during special mantrailing—search work, when the dog is sniffing the ground with an outstretched neck. The leash-holding element with controlled displacement moves on the axis line as a function of the forces acting on the leash-holding end element. The leash-holding element follows the mechanism of movement characteristic of search work, and allows smooth working for the search dog led on a leash.

19 Claims, 3 Drawing Sheets

(56) References Cited

U.S. PATENT DOCUMENTS

| | | | |
|---|---|---|---|
| 2006/0021584 A1* | 2/2006 | Abinanti | A01K 27/003 |
| | | | 119/792 |
| 2006/0236954 A1* | 10/2006 | Abinanti | A01K 27/001 |
| | | | 119/792 |
| 2006/0249097 A1* | 11/2006 | Goldberg | B60R 22/10 |
| | | | 119/771 |
| 2007/0034164 A1 | 2/2007 | Sporn | |
| 2007/0044735 A1 | 3/2007 | Zimmerman | |
| 2008/0072404 A1* | 3/2008 | Wetter | B60R 22/48 |
| | | | 24/68 R |
| 2010/0263602 A1* | 10/2010 | Cho | A01K 27/002 |
| | | | 119/792 |
| 2011/0308479 A1* | 12/2011 | Kuo | A01K 27/002 |
| | | | 119/792 |
| 2012/0024239 A1* | 2/2012 | Forbes | A01K 27/002 |
| | | | 119/850 |
| 2014/0311423 A1* | 10/2014 | Roney, III | A01K 27/002 |
| | | | 119/792 |
| 2016/0213166 A1* | 7/2016 | Law | A47D 13/046 |

* cited by examiner

DOG HARNESS WITH A LEASH-HOLDING ELEMENT WITH CONTROLLED DISPLACEMENT

CROSS-REFERENCE TO RELATED APPLICATIONS

This Application claims priority of Hungarian Application No. P1700113 filed on Mar. 14, 2017.

FIELD OF THE INVENTION

The present invention is directed to a dog harness with a leash-holding element with controlled displacement, developed primarily for search dogs performing special work, comprising a back strap, a leash ring fixed on the back strap for attaching a leash, a belly strap equipped with a quick release buckle, and a chest strap running between the chest bone and the throat area of an animal. The leash-holding element with controlled displacement has an elastic design, stretching along the axis line, in line with the spine of the dog to a given extent, reducing the load on the dog when the dog is led on a leash, primarily during special mantrailing—search work, when the dog is sniffing the ground with an outstretched neck. The leash-holding element with controlled displacement comprises an elastic portion and a loop portion limiting the stretching of the elastic portion, and a loop holding a leash-holding end element, which move in the direction of the axis line, at least partially through an opening formed between a strip limiting cover element and a saddle part and/or underlay, as a function of the forces acting on the leash-holding end element. Thereby, the leash-holding element follows the mechanism of movement characteristics of search work, and allows smooth working for the search dog led on a leash. The invention can be applied to several types of dog harnesses.

BACKGROUND OF THE INVENTION

Dog harnesses have been developed against the historical background of harnesses designed for horses. The aim of both horse harnesses and dog harnesses was to reduce the impacts acting on the body of the animal as a result of the pulling force.

In chest harnesses, a chest strap extends horizontally on the chest of the animal between the neck and the chest bone to the area of each of the shoulder joints of the animal. In the case of this type of harness, the load acts on the chest of the animal, thereby allowing it to pull larger weights. The spread of chest harnesses in Europe is attributable to people of inner-Asian origin—the Avars, the Huns, and the Hungarians.

With the relegation of pulling or driving horses to the background, chest harnesses were further developed primarily for dogs, as they provided an ideal solution for leading a dog on a leash, holding it back, and for distributing the pressure caused by the acting forces.

The dog chest harnesses found in the prior art comprise leather and/or textile straps, padded on the back part, chest part and belly part, with an underlay in a fixed or sometimes in a releasable manner. Dog chest harnesses padded on the part that is on the back of the dog are sometimes shaped like a horse saddle, and are also called "saddle-harnesses". In this case, the padded saddle part or underlay rests on the back of the dog, covering it like a saddle. The purpose of padding is to stabilize the straps, and to allow the attachment, display of additional equipment (e.g. bag, light, GPS or camera devices) and/or graphic elements, high visibility colors, or labels on the padding itself or on the cover thereof. Due to the saddle part, such additional equipment does not come into contact with, and does not irritate, the back of the dog. In Europe, the most common dog chest harness design is a Hungarian development, the K9 "Powerharness" from 1997, which was introduced first for Austrian, then for German service dog units (DE302009060989).

Another type of pulling harness is the collar and hames harness. While in the Carpathian Basin the use of chest harnesses was common, in the Western cultures, typically collar and hames harnesses were used for horses. The collar and hames harnesses put the load mainly on the shoulders of the animal, which is an advantageous solution for load distribution and for using the pulling power of the animal. These harnesses also served as a basis for the development of dog harnesses.

Mantrailing (search dog) harnesses developed for special use, following the design of collar and hames harnesses, are not particularly suitable for everyday use because the leash ring is located on the back of the dog in line with the stomach, in order to ensure that the dog is not disturbed by the leash during work. During search work, with its nose on the ground, the dog performs a special movement for an extended period of time, during which it must follow a trail with maximum concentration. During search work, while moving fast, with its body stretched out and its nose on the ground, the dog assumes a very different body posture than the normal body posture during walks. During search work, the leash runs almost in line with the back of the dog at a small angle with it, as the dog works with its nose on the ground. The dog can be disturbed in its work by every unintended movement of the leash, every displacement, or any elastic contraction of the dog harness. The active search work of a dog is very limited in time. A favorable dog harness design can help a lot in making the mantrailing work successful, and therefore it is expedient to develop it further.

Search dogs, who during their work strain every nerve to concentrate on following the person or object to be found, should be spared from impacts caused by the tugging of the leash.

Dog harnesses of an elastic design often include elastic portions, but only to make them comfortable and form fitting. They can be of help when lifting the dog, but they are impractical to use in the case of search dogs.

Patent Publication No. US 2007/0034164 A1 discloses an invention where, on the chest part of an elastic harness, the continuity of the load-bearing (non-elastic) straps is interrupted by an elastic insert.

The dog harness of Zimmerman (Patent Publication No. US 2007/0044735 A1) has been developed for special use. This reference, however, refers only in general to the use of elastic straps for added comfort, providing a form-fitting and comfortable design.

The references listed above are not suitable for long-term elastic compensation of the forces acting on the dog when leading the dog on a leash. Rather, they serve special purposes.

One of the biggest disadvantages of the above references is that no element limiting the stretching of any elastic elements is provided for the dog harness, to perform a load-bearing function and to limit the stretching of the elastic portions, relieving them and preventing their overloading. The elastic elements are also load-bearing elements. Elastic design is incorporated only as a general function arising obviously from elasticity. Therefore, the permanent deforming stretching of the elastic portion is inevitable, and its breaking can be avoided only by using oversized, excessively thick elastic elements.

The long-term, safe use of the stretching elements is of primary importance, and it is possible only if the stretching of the elastic structural elements is limited by a separate structural portion.

The prior art closest to the present invention is a further developed version of a dog chest harness, the K9 "Powerharness". The chest harness with an elastic chest strap of the prior art goes beyond providing comfort, which would obviously result from an elastic design.

The harness disclosed in Hungarian Patent No. P1400100 comprises an elastic portion on both parts of an openable chest strap running horizontally so as to surround the chest of the animal. An aim of that invention was to implement an elastic chest portion of a harness that is suitable for securing four-legged animals, primarily dogs, e.g. in a car, and, at the same time, is also of assistance during everyday actions such as walks. A chest strap of an elastic design and/or a design capable of elastic, dimensionally stable, stretching over a given section, protecting the shoulder joints by limiting the stretching, absorbing the micro-vibrations, is advantageous primarily for leading the dog on a leash on a daily basis.

Still another aim was to make the harness also suitable for other mammals kept as pets (rabbits, cats, etc.) which have a different chest anatomy from that of dogs, by making the elastic chest strap portion of the harness always close fitting during movement, retracting after each jump or step. The reference comprises an elastic portion on both parts of the chest strap with an element limiting the stretching thereof, ensuring that the joints of the animal are spared during use.

A disadvantage of the invention in that reference is that the developed elastic portion and the element limiting the stretching thereof cannot be transferred to the line of a leash-holding end element because the elastic portion cannot withstand, in the long term, forces acting directly from varying directions. Furthermore, the abrasion resistance of elastic materials combined with textiles is far below that of straps generally used for harnesses. Therefore, the leash-holding end element could damage the surface of the elastic portion. When leading the dog on a leash, the whole back part of the dog harness could be displaced, and that could disturb the dog. Another disadvantage is that the leash is attached to a leash ring at a distance from the adjustable-length chest strap, thereby, when the leash is pulled, the animal can be expected to feel the displacement of the leash and/or the elastic portion, or the whole dog harness, at least on its back and chest. Moreover, the elastic design in this form, as a function of the materials used, can lead to undesirable electrical charge build-up.

A further disadvantage of the invention in that reference is that the chest strap stretches the elastic portion by its own weight, especially in the vertical direction. A chest strap sliding down towards the legs of the dog due to an uneven load can hinder the movement of the animal. Furthermore, the fastener ring can turn out as a result of the loads, as the fastener ring is not held tightly by the load-bearing strap on the side towards the saddle part. This can lead to the fastener/adjuster ring holding the chest strap turning with its narrower side into the horizontal direction and wrinkling the chest strap. The element limiting the stretching of the elastic portion is a loose loop, which allows the displacement or turning out of the ring.

Yet another disadvantage of the invention in that reference is that the production process is complicated, as the extent of stretching on the two parts, opposite sides of the adjustable-length chest strap, needs to be harmonized. The extent of stretching should be the same on both sides of the dog harness (that is the two parts of the chest strap), otherwise the harness can turn on the body of the mammal. Moreover, the animal can even get loose from the harness.

In general, it can be stated that the prior art discloses dog harnesses in which the elastic design, the movement, friction of the dog harness as a whole, or elements thereof, have an undesirable physical effect perceptible to the search dog doing its work.

In general, it can be stated that, in the prior art, the elastic portions or the elements limiting their stretching come into contact with the body of the dog at least partially, or are designed as structural elastic elements surrounding the body of the dog, or moving on the body of the dog, which can irritate the dog.

The prior art does not include a chest or collar and hames harness developed for search dogs that would solve the above problems, and would make the work of search dogs smooth.

SUMMARY OF THE INVENTION

An object of the present invention is to eliminate the above disadvantages in full, and to implement a leash-holding element with controlled displacement in line with the spine of the dog. The device is implemented in such a way that its operation is not perceptible to the dog when the dog is led on a leash, and no physical impact is felt specifically by search dog, with its body constantly stretched out and its nose to the ground, in a way that would distract it from following a trail. Nevertheless, elastic portion(s) need to be incorporated into the dog harness in combination with a leash-holding end element, and the extent of stretching should be limited.

Another object of the present invention is to incorporate an elastic portion with limited stretching, with an element limiting the stretching thereof, directly at a leash-holding end element, i.e., at the leash ring (end element) holding the leash, in a manner touching the back strap of the dog harness, to ensure that, during the work of search dogs, the forces acting through the leash are compensated for as soon as possible, at the moment of reaching the dog harness.

Another object of the present invention is to provide a harness that will dampen the micro-vibrations caused by leading a dog on a leash directly at the element holding the central ring, and to ensure that, due to the special design, the back part of the harness, or the other straps surrounding the dog, are not displaced by the acting forces, or that the back or chest of the dog is not irritated by the displacement of the dog harness.

Another object of the present invention is to ensure that the leash-holding end element (ring) performs its function, and that it withstands several times the weight of the dog in the event of unexpected forces, irrespective of the direction in which the forces act.

Another object of the present invention is to ensure that the leash-holding end element of the leash-holding element with controlled displacement and the loop holding it can move in a direction parallel to the spine of the dog. However, in the event of forces acting at any other angle on the spine, their movement is confined to between the fixing zones of a cover element, running parallel to the axis line, and the back part of the dog harness.

Another object of the present invention is to provide at least one lining/underlay on the back part of the dog harness, wider than the elastic portion and the loop portion limiting the stretching of the elastic portion, for positioning the leash-holding element with controlled displacement, and for separating it from the body of the dog. An aim of the underlay(s)—in addition to those known in the prior art—is not only to ensure that the elastic portion or the loop portion limiting the stretching of the elastic portion does not come into direct contact with the body of the dog, but also to absorb and dampen the friction caused by the elastic operation and the forces wrinkling the saddle part. The main aim of the underlay is to stiffen the back part of the dog harness in the direction of the stretching of the elastic portion, which could otherwise be creased or wrinkled by the operation of the elastic portion. Another aim can be to incorporate multiple layers of underlays of different physical properties, segments of which can be formed from the saddle part, in the continuation thereof, on the side towards the elastic portion.

Another object of the present invention is to make the loop portion limiting the stretching of the elastic portion form a protrusion aligned with the spine of the dog, extending away from the body of the dog, which protrusion, due to the lining/underlays and/or the saddle part, will not come into contact with the back of the dog. Another aim is to completely prevent the protrusion from getting caught up on obstructions encountered by the dog during use by forming a closed loop perpendicular to the spine and the direction of movement (that is, the axis line). Upon the stretching of the elastic portion, the protrusion should rest flat on the lining/underlay and/or the elastic portion in such a way that the elastic operation is imperceptible to the dog.

Another object of the present invention is to design the fixing zones, and the length of the elastic portion, and the length of the loop portion limiting the stretching of the elastic portion (extent of protrusion), so as to ensure that the elastic portion can withstand, in the long term, stretching to the length of the fully straightened loop portion limiting the stretching thereof without wearing out, but the loop holding the leash-holding end element should not reach the edging element bordering the saddle part, because a contact could damage both the edging element and the loop holding the leash-holding end element.

Another object of the present invention is to form a neck leash-holding element suitable for attaching a leash on the dog harness, on a neck extension thereof, which neck leash-holding element is not elastic, and allows safe leading on a leash. This should be formed closer to the neck of the dog, in line with its forelegs, in order to ensure that in case of an emergency, leading on a leash is as safe as possible. This neck leash-holding element is covered in a releasable manner in order to prevent it from getting caught up.

Thus, the present invention is directed to a dog harness with a leash-holding element with controlled displacement in such a way that an elastic portion and a loop portion limiting the stretching thereof are in line with a leash-holding end element (ring), connected to an underlay formed from a saddle part, in the continuation thereof, or as a separate structural element on the saddle part, and a strip limiting cover element. The width of the underlay on both sides of the axis line should be determined by the fixing zone of the strip limiting cover element. The fixing zone of the strip limiting cover element should preferably separate from each other the side portion of the back part and the underlay.

The present invention also is directed to the structure holding the leash-holding element and primarily the elastic portion, moving in the direction of the axis, being made durable, and to appropriately limit its elasticity or movement in spite of the fact that this is the point on which the greatest concentrated force acts when leading the dog on a leash.

The present invention also is directed to limiting or preventing the movement of the elastic portion in the direction perpendicular to the axis line by a separate strip limiting cover element and its strip limiting cover element fixing zones parallel to the axis line along the whole length thereof. The length of the elastic portion and the loop portion limiting the stretching of the elastic portion is limited by fixing zones.

The present invention also is directed to ensuring that the loop portion limiting the stretching of the elastic portion extends beyond the elastic portion in the direction perpendicular to the axis line, and to forming the loop portion fixing zone in the strip portion extending beyond the elastic portion, in a manner not touching the elastic portion. The length of the elastic portion measured in the rest state can be increased, due to which the load on the elastic portion is reduced, ensuring a long-term utility value. Over this particular section, the elastic portion should move, stretch freely along the axis line of the dog harness. Therefore, the fixing zones of the elastic portion and the fixing zones of the element limiting the stretching of the elastic portion should, at least partially, differ from each other in terms of design and position.

The present invention also is directed to having an additional neck leash-holding element, e.g., a leash ring, located on the dog harness in the continuation of the loop portion limiting the stretching of the elastic portion, in a manner not affecting the stretching of the elastic portion. This makes the dog harness suitable for street use or use in case of an emergency, where the elastic design performing the tasks described above is not needed.

Thus, the present invention relates to a dog harness with a leash-holding element with controlled displacement formed on the dog harness which comprises a back part, a back strap connected thereto and a leash-holding end element included in a loop holding the leash-holding end element, a chest part and/or neck strap, and a belly strap connected to the back part, an elastic portion, whereby the stretching of the dog harness as a function of the forces acting when leading the dog on a leash is controlled by at least one loop portion limiting the stretching of the elastic portion of the dog harness.

An important aspect of the present invention is that the leash-holding element with controlled displacement, arranged symmetrically on the back part of the dog harness, on the axis line and on both sides of the axis line, comprises a leash-holding end element, a loop holding the leash-holding end element, an underlay lining the leash-holding end element at least partially, at least one elastic portion resting flat thereon and a loop portion limiting the stretching of the elastic portion, protruding from the back part, traversable perpendicularly to the axis line, forming an open loop, separated from the leash-holding end element by a strip limiting cover element. Furthermore, the underlay and the strip limiting cover element extend beyond the loop portion limiting the stretching of the elastic portion in the direction perpendicular to the axis line, on both sides of the axis line, and are fixed together on both sides of the axis line in a strip limiting cover element fixing zone, forming a traversable opening open in the direction of the axis line, resting flat on the back part, and thereby, as a function of the forces acting through the leash-holding end element, the elastic portion and the loop portion limiting the stretching of the elastic portion at least partially intrude between the strip limiting cover element, the underlay and the strip limiting cover element fixing zones.

A further important aspect of the present invention is that the movement of the elastic portion and the loop portion limiting the stretching of the elastic portion in any direction other than parallel to the axis line is tightly limited on both sides of the axis line by the strip limiting cover element and the strip limiting cover element fixing zones.

Preferably, the distance between the elastic portion fixing zone and the elastic portion fixing zone towards the end element on the same side of the axis line of the leash-holding element is larger than the distance between the fixing zone towards the holding loop and the loop portion fixing zone.

Preferably, at least the end of the underlay towards the leash-holding end element ends under an edging element.

Preferably, the underlay is formed at least partially from the saddle part, in the continuation thereof.

Preferably, the strip limiting cover element ends under the edging element on both sides of the axis line.

Most preferably, the side portion hook and loop fastener component ends under the strip limiting cover element.

Preferably, the displacement of the loop holding the leash-holding end element, controlled by the loop portion limiting the stretching of the elastic portion, is confined to between the strip limiting cover element and the edging element.

Most preferably, the strip limiting cover element is perpendicular to the leash-holding element with controlled displacement.

Preferably, the leash-holding element with controlled displacement has an extension holding element at the strip portion opposite to the leash-holding end element, connecting the back part and a neck extension of the leash-holding element on the axis line.

Most preferably, the neck extension of the leash-holding element has at least one neck leash-holding element on the axis line.

Preferably, the neck leash-holding element has a closing element, which can close the neck leash-holding element flat on the neck extension of the leash-holding element.

Preferably, there is a cover element corner fixing element at the point of the strip limiting cover element fixing zone closest to the leash-holding end element on both sides of the axis line, arranged symmetrically.

BRIEF DESCRIPTION OF THE FIGURES

The dog harness with a leash-holding element with controlled displacement according to the present invention will be better understood when taken with the figures, in which.

DETAILED DESCRIPTION OF THE INVENTION

Figure 1:
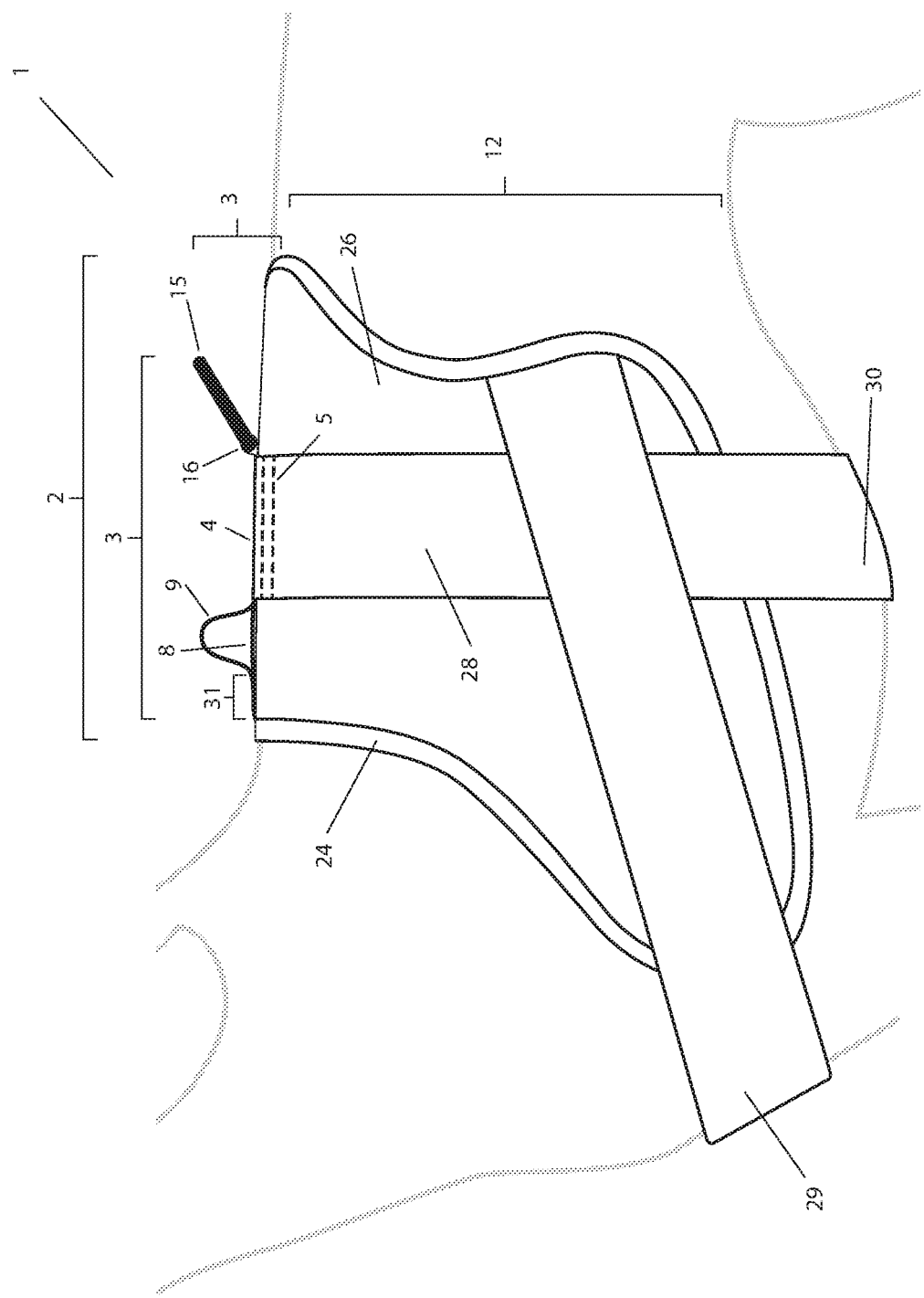
FIG. 1 is a side view of a dog chest harness of the present invention, with a strip limiting cover element formed from a back strap, with strip limiting cover element fixing zones fixing it and, according to a most preferred embodiment, a loop portion limiting the stretching of an elastic portion, protruding vertically.

FIG. 1 shows a side view of a dog chest harness of the present invention on a dog, comprising a back part 2 resting on the back of the dog, lined at least partially by a saddle part 26 to prevent the individual fastener elements from coming into direct contact with the back of the dog. In one embodiment, the foam padded saddle part 26 lines the back strap 28 of the back part 2 and at least partially the chest part 29. The back part 2 of the dog harness 1 has a side portion 12 extending vertically from the leash-holding element with controlled displacement 3 on both sides of the dog. The side portion 12 is bordered by a strip limiting cover element fixing zone 5 and an edging element 24. The back strap 28 and the chest part 29 located at least partially on the side portion 12 do not come into direct contact with the body of the dog because they are lined at least partially by the saddle part 26. The saddle part 26, at least on the side facing towards the dog, is made of a skin-friendly material, preferably cotton. The underlay 25 (shown in FIG. 2), in the embodiment of the present invention shown in FIG. 1, is formed from the saddle part 26, in the continuation thereof. The saddle part 26, at least to the extent of the leash-holding element with controlled displacement 3, is thicker, reinforced to offset any wrinkling on the saddle part 26 resulting from elastic operation.

A belly strap 30 extends from the back part 2, ending in the back strap 28 on the side portion 12 of the back part 2. In an embodiment of the chest harness of the present invention, the back strap 28 extends up to the strip limiting cover element fixing zone 5, then a strip limiting cover element 4 is formed from the back strap 28, in the continuation thereof, forming a traversable opening. The saddle part 26 is bordered by an edging element 24. The leash-holding element with controlled displacement 3 is formed on the back part 2 of the saddle part 26, comprising a loop portion 9 limiting the stretching of the elastic portion and an elastic portion 8 sliding under the strip limiting cover element 4, separated from a leash-holding end element 15 and a loop 16 holding the leash-holding end element by the strip limiting cover element 4. The loop portion 9 limiting the stretching of the elastic portion 8 is a bulging part formed preferably from a strap, traversable in the direction of the back strap 28, which rests flat on the elastic portion 8 when it stretches as a result of the forces acting on the harness when leading the dog on a leash. The leash-holding element with controlled displacement 3 is held by the edging element 24 at least at the strip portion 31 opposite to the leash-holding end element.

The strip limiting cover element fixing zone 5 crosses the back strap 28 on the back part 2, and separates it from the strip limiting cover element 4. Preferably, the strip limiting cover element 4 is formed from the back strap 28, in the continuation thereof. The strip limiting cover element 4 separates the leash-holding end element 15 and the strip portion 31 opposite to the leash-holding end element from each other, forming a traversable flat loop between them.

Figure 2:
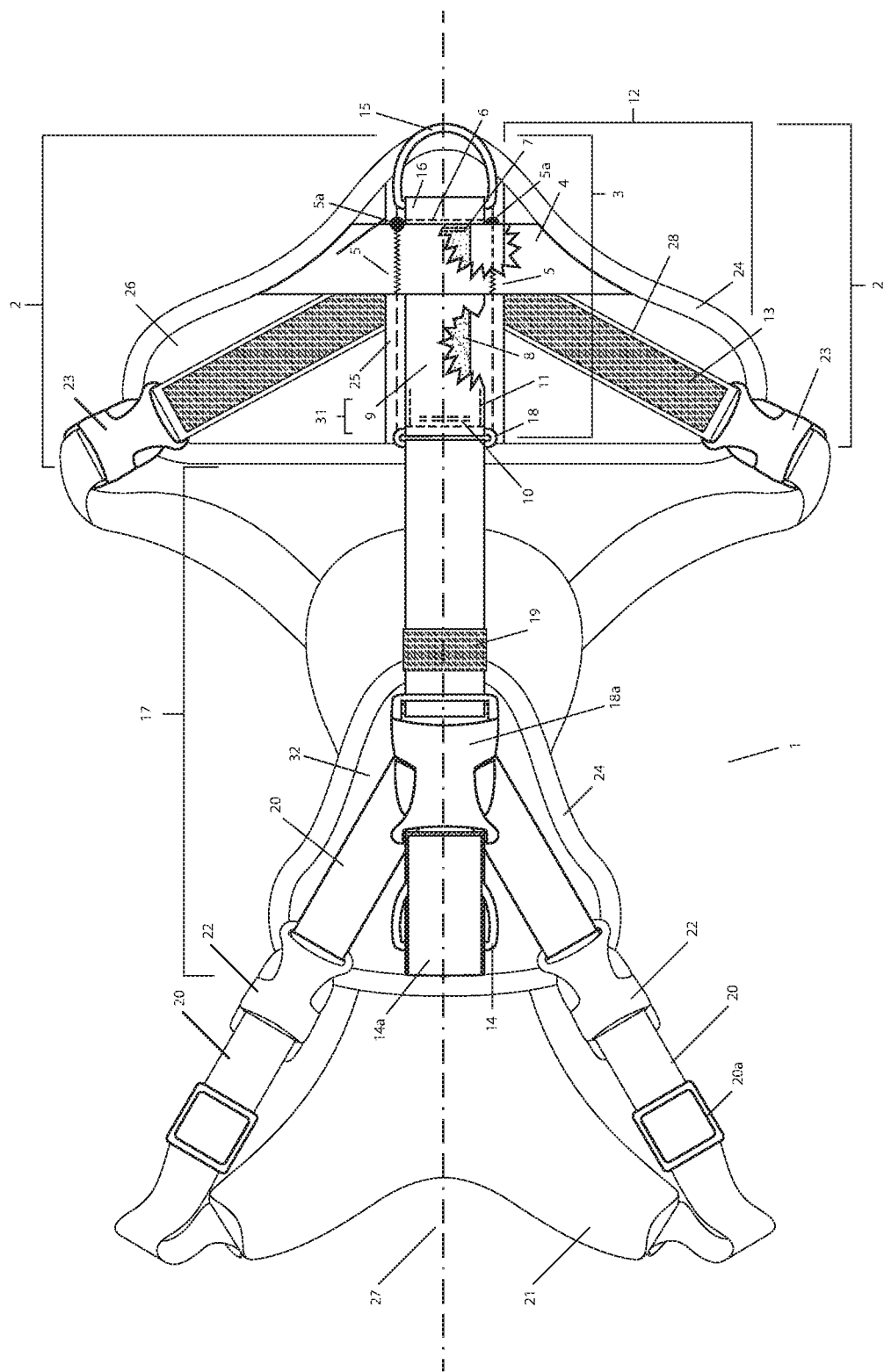
FIG. 2 is a top view of the connection of a back part, a neck extension of a leash-holding element and a lower chest lining element to each other on a collar and hames style search dog harness, with other associated elements and a leash-holding element with controlled displacement on the back part, with parts thereof shown in local cross-sections.
Figure 3:
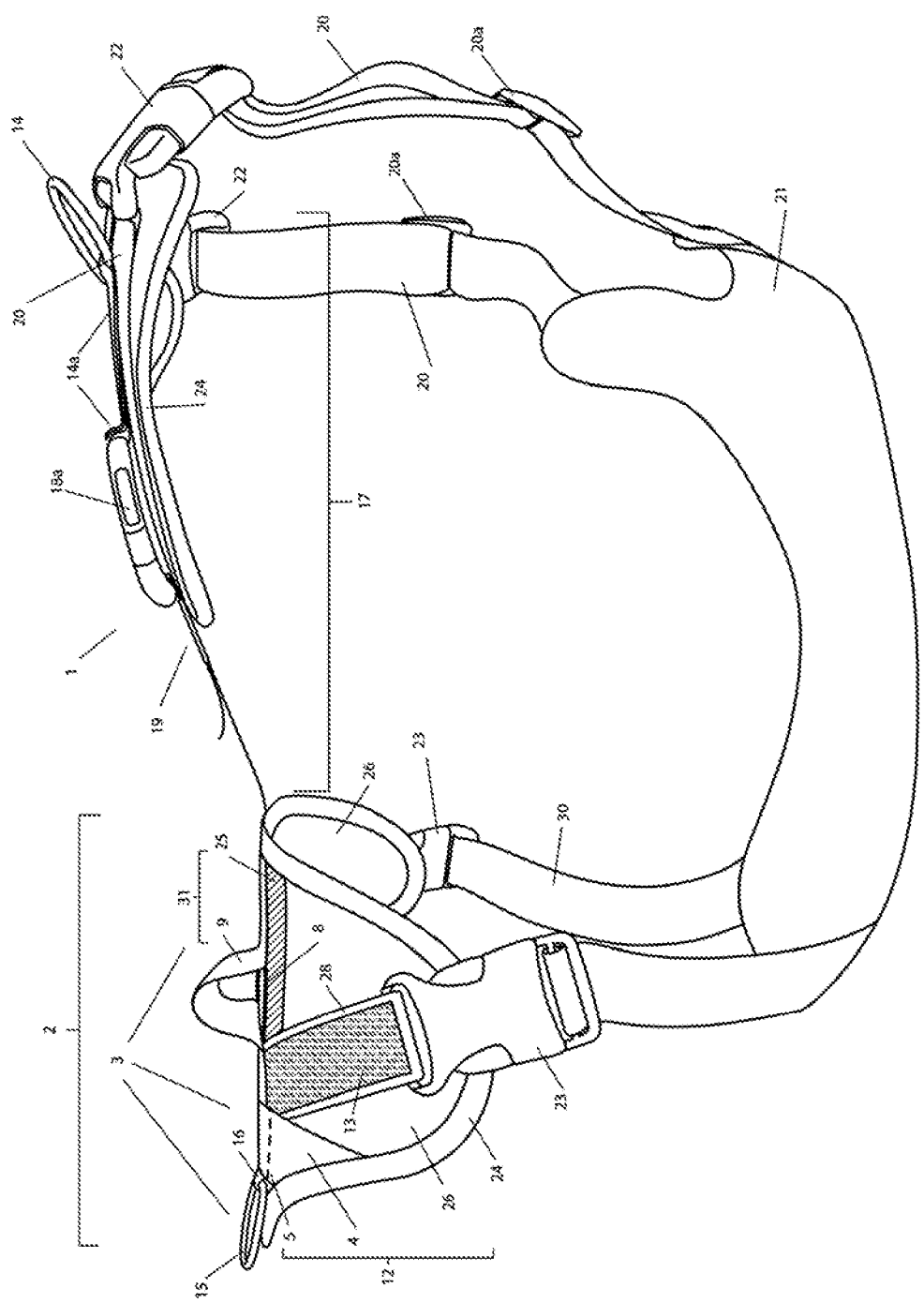
FIG. 3 is a side view of a search dog harness of the present invention comprising three main parts connected in a releasable manner, with a leash-holding element with controlled displacement on the saddle part of the back part, and the parts thereof.

FIG. 2 shows a top view of a search dog harness 1 made for special use in an outspread position, while FIG. 3 shows a side view thereof, in an embodiment comprising a back part 2, a neck extension 17 of the leash-holding element, a chest lining element 21, a neck strap 20 and a belly strap 30 connected thereto, as its main parts. The back part 2 comprises two side portions 12 hanging down on both sides of the dog, and a saddle part 26 preferably lining 100% of the whole back part 2, to which straps surrounding the waist of the dog are attached in a fixed manner. The back part 2 has a back part fastener element 23, connecting to the belly strap 30 and partially lined by the saddle part 26 of the back part 2.

The side portion 12 is bordered by the leash-holding element with controlled displacement 3 and the underlay 25 thereof, as well as the edging element 24. The side portion 12 is preferably a padded element. The underlay 25 can be a separate strap, a reinforcement fixed on the saddle part, or it can be formed by the saddle part 26 itself, as shown in FIGS. 2 and 3.

In one embodiment, the leash-holding element with controlled displacement 3 is formed on the side portions 12 of the back part 2, connecting to the back strap 28 at the connection of a side portion hook and loop fastener component 13 and the strip limiting cover element 4 attached thereon, arranged symmetrically on both sides of the axis line 27, as shown in FIG. 2. The strip limiting cover element 4 extends into the side portions 12 on both sides of the axis line 27, as shown in FIG. 2, most preferably ending under the edging element 24.

The leash-holding element with controlled displacement 3 comprises a leash-holding end element 15, a loop 16 holding it, and a strip limiting cover element 4 pressing it down along the line of a fixing zone towards the holding loop 6, as shown in FIG. 2. The leash-holding element with controlled displacement 3 is fixed by strip limiting cover element fixing zones 5 to the back part 2 of the dog harness 1 and at the same time to the underlay 25 on both sides of the axis line 27. FIG. 2 shows an elastic portion fixing zone towards the end element 7 in a local cross section, covered at least partially by the strip limiting cover element 4, an underlay 25 at least partially enclosing, together with the strip limiting cover element 4, the loop holding the leash-holding end element 16 and/or the elastic portion 8, and a loop portion 9 that limits the stretching of the elastic portion 8. Loop portion 9 is open in both directions perpendicularly to the axis line 27, as shown in FIG. 2, elastic portion 8 is shown in a local cross section, and a loop portion fixing zone 11 and an elastic portion fixing zone 10 are shown in FIG. 2, formed in a strip portion opposite to the leash-holding end element 31 in the continuation of the loop portion 9 limiting the stretching of the elastic portion 8.

Preferably, the loop portion fixing zone 11 shown in FIG. 2 is closer to the loop portion 9 limiting the stretching of the elastic portion 8 than the elastic portion fixing zone 10 shown in FIG. 2. Thus, the length of the elastic portion 8 can be longer than the total length of the loop portion 9 limiting the stretching of the elastic portion 8. The section of the elastic portion 8 free from fixing zones, capable of stretching, is determined by the distance between the elastic portion fixing zone towards the end element 7 and the elastic portion fixing zone 10, both shown in FIG. 2. FIG. 2 shows the preferable distance between the elastic portion fixing zone towards the end element 7 and the elastic portion fixing zone 10 compared to the length of the loop portion 9 limiting the stretching of the elastic portion 8. This has a decisive influence on the service life of the elastic portion 8 and also the operation of the leash-holding element with controlled displacement 3, because the overloading of the elastic portion 8 can be prevented.

FIG. 2 shows the preferable distance between the elastic portion fixing zone towards the end element and the elastic portion fixing zone compared to the length of the loop portion limiting the stretching of the elastic portion, which is longer by the extent of the protrusion.

FIG. 2 shows, in a local cross section, that the loop portion 9 limiting the stretching of the elastic portion 8 is wider than the elastic portion 8 in the direction perpendicular to the axis line 27—protecting it from UV radiation—and that the loop portion 9 limiting the stretching of the elastic portion 8 has an open design in the direction perpendicular to the axis line 27.

According to an aspect of the invention, the loop portion 9 of FIGS. 2 and 3 is formed from the loop holding the leash-holding end element 16, in the continuation thereof, and protrudes from the back part 2 of the dog harness 1. In one embodiment, the loop holding the leash-holding end element 16 and the strip limiting cover element 4 are textile straps of the same weaving density, structure and material. In the event of maximum forces acting on the leash-holding ring 15, the loop portion 9 and the stretching elastic portion 8 are resting flat on each other. The loop portion 9 and the elastic portion 8 are designed to slide under the strip limiting cover element 4 as a function of the acting forces, as the leash-holding element with controlled displacement 3 is fixed together with the back part 2 in a fixed manner only at the strip portion 31 opposite to the leash-holding end element, by sewing and/or riveting.

Preferably, the strip portion 31 opposite to the leash-holding end element is lined by the saddle part 26 and the underlay 25, and is fixed together with them in a fixed manner, e.g., by sewing.

The leash-holding element with controlled displacement 3, with the exception of the strip portion 31 opposite to the leash-holding end element and the strip limiting cover element 4, moves in a direction parallel to the axis line 27, best shown in FIG. 2, as a function of the forces acting on the leash-holding end element 15.

The loop 16 holding the leash-holding end element 15 moves in a direction parallel to the axis line 27, shown in FIG. 2, as a function of the pulling forces acting on the leash-holding end element 15, to the extent of the length of the loop portion 9 limiting the stretching of the elastic portion 8, moving between the underlay 25 and the strip limiting cover element 4. In the event of maximum load acting on the leash-holding end element 15, the loop portion 9, protruding from the back part 2 and the leash-holding element with controlled displacement 3, and the elastic portion 8, are resting flat on each other, and the loop portion 9 intrudes between the underlay 25 and/or the saddle part 26, and the strip limiting cover element 4.

On a dog harness 1 designed for search dogs, the strip limiting cover element 4 is a separate structural element, preferably closing an angle of 25-85 degrees with the back strap 28.

Most preferably, the strip limiting cover element 4 is perpendicular to the axis line 27, as shown in FIG. 2, and is fixed together with the underlay 25 and/or the saddle part 26 in the strip limiting cover element fixing zone 5 on both sides of the axis line 27. The underlay 25 acts as a liner for at least the meeting point of the strip limiting cover element 4 and the loop 16 holding the leash-holding end element, over the full width of the strip limiting cover element 4 measured in the direction of the axis line 27.

The underlay 25 is covered by the edging element 24 of the saddle part 26 on both sides of the axis line 27. The underlay 25 extends beyond the width of the loop 16 holding the leash-holding end element by at least 10 millimeters in the direction perpendicular to the axis line 27, as shown in FIG. 2.

Preferably, the side portion 12 extends up to the strip limiting cover element fixing zone 5 of the leash-holding element with controlled displacement 3, and preferably continues in the underlay 25 and/or extends under it. The underlay 25 can be the saddle part 26 itself, or the saddle part 26 can include additional internal reinforcements.

Preferably, the leash-holding element with controlled displacement 3 and the strip limiting cover element 4, as well as the underlay 25, are textile straps of the same material and surface, with high abrasion resistance. The width of the strip limiting cover element 4 measured perpendicularly to the axis line 27 is larger than the width of the loop portion 9 limiting the stretching of the elastic portion 8 and the loop 16 holding the leash-holding end element 15 measured perpendicularly to the axis line 27, as shown in FIG. 2.

A cover element corner fixing element 5a is shown in FIG. 2 at the point of the strip limiting cover element fixing zone 5 closest to the leash-holding end element 15 on both sides of the axis line 27, arranged symmetrically, which is preferably, e.g., a rivet or zig-zag sewing.

At least one back part fastener element 23 is provided on the back part 2, ending in a belly strap 30 surrounding the belly of the dog, as shown in FIG. 3.

A side portion hook and loop fastener component 13 is arranged symmetrically on the back part 2, on the back strap 28 on both sides of the axis line 27, as shown in FIG. 2. The side portion hook and loop fastener component 13 serves to support displays of graphic elements, and one end thereof ends under the strip limiting cover element 4, while the other end thereof ends freely in the direction of the back part fastener element 23.

The leash-holding element with controlled displacement 3, in the strip portion 31, ends in an extension holding element 18, as shown in FIG. 2, from which a neck extension 17 of the leash-holding element starts.

The neck extension 17 of the leash-holding element is connected to the back part 2 by the extension holding element 18, as shown in FIG. 2. Preferably, the length of the neck extension 17 of the leash-holding element is adjustable by a back part slide adjuster 19, or it can be released/adjusted by an extension fastener element 18a, shown in FIGS. 2 and 3. A neck strap 20 surrounds the neck of the dog on both sides, and is lined at least partially by a neck padding portion 32 partially extending under the neck fastener elements 22. The neck strap 20 surrounds the chest of the dog from below, and ends in a chest lining element 21. The neck strap 20 has a slide adjuster 20a for adjusting its length.

Preferably, the back part 2, the neck extension of the leash-holding element 17 and the chest lining element 21 are designed to be connected to each other in a releasable manner.

Preferably, the neck extension 17 has a neck leash-holding element 14 on the axis line 27, as shown in FIG. 2, which can be closed on the neck extension 17 by a closing element 14a, to prevent it from getting caught. The neck extension 17 is partially bordered by an edging element 24. The extension fastener element 18a has a neck padding portion 32 on the side towards the body of the dog.

The dog harness with a leash-holding element with controlled displacement provides a clearly perceptible improvement in comfort to search dogs when led on a leash, going far beyond the elastic dog harnesses found in the prior art. The invention ensures primarily in the case of dogs working in a special field, such as search dogs, that the forces arising from the special movements of the dog during work are absorbed in an imperceptible manner, and provides for smooth working for the dog.

The invention eliminates the form fitting design characteristic of elastic dog harnesses, the friction on the body of the dog, or the contact with the elastic parts, because the elastic portion is incorporated on the axis line, lined by an underlay and/or a saddle part. The forces acting on the dog harness are absorbed by the leash-holding element with controlled displacement already at the leash-holding end element, thereby greatly supporting the dog in concentrating on the search work.

LIST OF REFERENCE NUMBERS 1. dog harness
2. back part
3. leash-holding element with controlled displacement
4. strip limiting cover element
5. strip limiting cover element fixing zone
5a. cover element corner fixing element
6. fixing zone towards the holding loop
7. elastic portion fixing zone towards the end element
8. elastic portion
9. loop portion limiting the stretching of the elastic portion
10. elastic portion fixing zone
11. loop portion fixing zone
12. side portion
13. side portion hook and loop fastener component
14. neck leash-holding element
14a. closing element
15. leash-holding end element
16. loop holding the leash-holding end element
17. neck extension of the leash-holding element
18. extension holding element
18a. extension fastener element
19. back part slide adjuster
20. neck strap
20a. slide adjuster
21. chest lining element
22. neck fastener element
23. back part fastener element
24. edging element
25. lining/underlay
26. saddle part
27. axis line
28. back strap
29. chest part
30. belly strap
31. strip portion opposite to the leash-holding end element
32. neck padding portion

The invention claimed is:

1. A dog harness with a leash-holding element with controlled displacement, the harness comprising:
   a back part;
   a back strap connected to the back part and a leash-holding end element (15) included in a loop (16) holding the leash-holding end element,
   a neck strap,
   a belly strap connected to the back part, and
   an elastic portion (8),
   wherein stretching of the dog harness as a function of forces acting on the dog harness, when leading a dog on a leash, is controlled by at least one loop portion limiting the stretching of the elastic portion (9) of the dog harness, wherein the leash-holding end element (15) is arranged symmetrically on the back part of the dog harness, on an axis line (27), on both sides of the axis line and includes:

an underlay lining at least partially the loop holding the leash-holding end element (16), and at least the elastic portion (8) resting flat on the underlay and the loop portion limiting the stretching of the elastic portion (9), protruding from the back part, traversable perpendicularly to the axis line, forming an open loop, and separated from the leash-holding end element (15) by a strip limiting cover element, wherein the underlay and the strip limiting cover element extend beyond the loop portion limiting the stretching of the elastic portion (9) in a direction perpendicular to the axis line, on both sides of the axis line, and the underlay and the strip limiting cover element being fixed together on both sides of the axis line in a strip limiting cover element fixing zone, forming a traversable opening open in the direction of the axis line (27), resting flat on the back part, and, as a function of the forces acting through the leash-holding end element (15), the elastic portion (8) and the loop portion limiting the stretching of the elastic portion (9) are able to intrude between the strip limiting cover element, the underlay and the strip limiting cover element fixing zone in the direction of the leash-holding end element (15), and wherein movement of the elastic portion (8) and the loop portion limiting the stretching of the elastic portion (9) in any direction other than parallel to the axis line is tightly limited on both sides of the axis line by the strip limiting cover element and the strip limiting cover element fixing zone, wherein the leash-holding element with controlled displacement has an extension holding element at the strip portion opposite to the leash-holding end element, connecting the back part and a neck extension of the leash-holding element on the axis line, and wherein the neck strap surrounds the chest of the dog from below and ends in a chest lining element.

2. The dog harness with the leash-holding element with controlled displacement according to claim 1, wherein the distance between an elastic portion fixing zone (10) and an elastic portion fixing zone towards the end element (7) on the same side of the axis line of the leash-holding element is larger than the distance between a fixing zone towards a holding loop and a loop portion fixing zone.

3. The dog harness with the leash-holding element with controlled displacement according to claim 2, wherein at least the end of the underlay towards the leash-holding end element ends under an edging element.

4. The dog harness with the leash-holding element with controlled displacement according to claim 2, wherein the underlay is formed at least partially from the saddle part, in a continuation thereof.

5. The dog harness with the leash-holding element with controlled displacement according to claim 2, wherein the strip limiting cover element ends under an edging element on both sides of the axis line.

6. The dog harness with the leash-holding element with controlled displacement according to claim 2, wherein a side portion hook and loop fastener component ends under the strip limiting cover element.

7. The dog harness with the leash-holding element with controlled displacement according to claim 1, wherein at least an end of the underlay towards the leash-holding end element (15) ends under an edging element.

8. The dog harness with the leash-holding element with controlled displacement according to claim 7, wherein the underlay is formed at least partially from the saddle part, in a continuation thereof.

9. The dog harness with the leash-holding element with controlled displacement according to claim 7, wherein the strip limiting cover element ends under the edging element on both sides of the axis line.

10. The dog harness with the leash-holding element with controlled displacement according to claim 7, wherein a side portion hook and loop fastener component ends under the strip limiting cover element.

11. The dog harness with the leash-holding element with controlled displacement according to claim 1, wherein the underlay is formed at least partially from a saddle part, in a continuation thereof.

12. The dog harness with the leash-holding element with controlled displacement according to claim 11, wherein the strip limiting cover element ends under an edging element on both sides of the axis line.

13. The dog harness with the leash-holding element with controlled displacement according to claim 1, wherein the strip limiting cover element ends under an edging element on both sides of the axis line.

14. The dog harness with the leash-holding element with controlled displacement according to claim 1, wherein a side portion hook and loop fastener component ends under the strip limiting cover element.

15. The dog harness with the leash-holding element with controlled displacement according to claim 1, wherein the displacement of the loop holding the leash-holding end element (16), controlled by the loop portion limiting the stretching of the elastic portion (9), is confined to between the strip limiting cover element and an edging element.

16. The dog harness with the leash-holding element with controlled displacement according to claim 1, wherein the strip limiting cover element is perpendicular to the leash-holding element with controlled displacement.

17. The dog harness with the leash-holding element with controlled displacement according to claim 1, wherein the neck extension of the leash-holding element has at least one neck leash-holding element on the axis line.

18. The dog harness with the leash-holding element with controlled displacement according to claim 1, wherein a neck leash-holding element has a closing element, which is configured to close the neck leash-holding element flat on the neck extension of the leash-holding element.

19. The dog harness with the leash-holding element with controlled displacement according to claim 1, wherein there is a cover element corner fixing element at the point of the strip limiting cover element fixing zone closest to the leash-holding end element (15) on both sides of the axis line, arranged symmetrically.

* * * * *